US008843765B2

(12) United States Patent
Dellow (10) Patent No.: US 8,843,765 B2
(45) Date of Patent: Sep. 23, 2014

(54) KEY DERIVATION SYSTEM

(71) Applicant: Broadcom Corporation, Irvine, CA (US)

(72) Inventor: Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 31 days.

(21) Appl. No.: 13/648,613

(22) Filed: Oct. 10, 2012

(65) Prior Publication Data

US 2014/0098953 A1 Apr. 10, 2014

(51) Int. Cl.
*G06F 21/00* (2013.01)
*G06F 21/57* (2013.01)

(52) U.S. Cl.
CPC .................................. *G06F 21/575* (2013.01)
USPC ........................................... 713/189; 380/44

(58) Field of Classification Search
None
See application file for complete search history.

(56) References Cited

U.S. PATENT DOCUMENTS 4,731,842 A * 3/1988 Smith ............................. 705/71
6,397,301 B1 * 5/2002 Quach et al. .................. 711/138

FOREIGN PATENT DOCUMENTS

EP 2 437 461 9/2011

\* cited by examiner

*Primary Examiner* — Gilberto Barron, Jr.
*Assistant Examiner* — Simon Kanaan
(74) *Attorney, Agent, or Firm* — Brinks Gilson & Lione (57) ABSTRACT

A device generates a content key that depends upon device security state information. For example, the device may retrieve a first content key and a security state, and then derive a content key using the first content key and the security state. Accordingly, if the security state is incorrect, then the generated content key is incorrect, and the device cannot decrypt content provided to the device.

20 Claims, 8 Drawing Sheets

KEY DERIVATION SYSTEM

TECHNICAL FIELD

This disclosure generally relates to a system for deriving keys, and more specifically to a system for deriving keys using device security information.

BACKGROUND

The consumer electronics marketplace is home to an endless array of electronic devices. These devices include, as just one example, set top boxes that are intended to deliver valuable content to subscribers in a secure manner. Such devices often employ security keys in the process of delivering content to the subscribers. Further improvements in content security will help drive increasing commercial success of digital content delivery to a wide range of devices.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
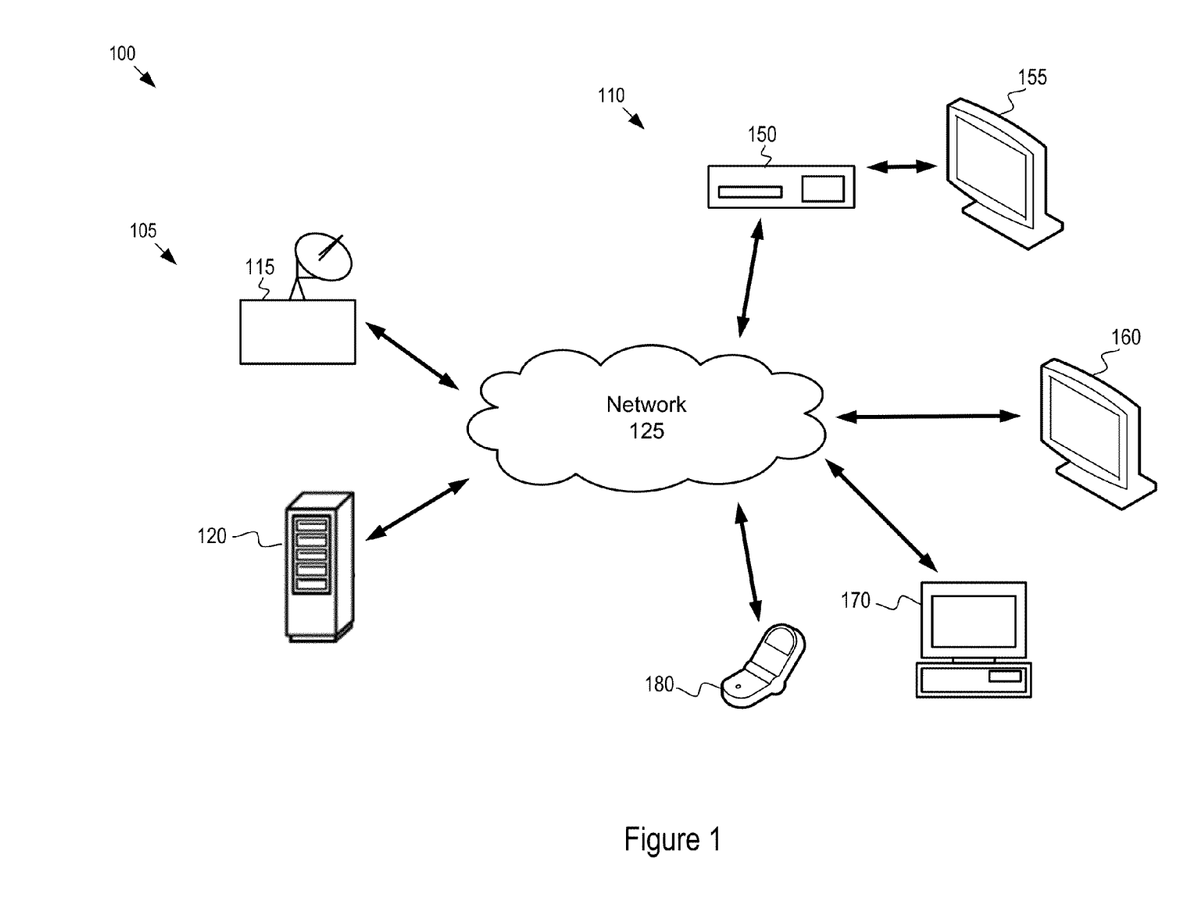
FIG. 1 shows an example of a network of devices that may share information.

FIG. 1 shows an example of a network 100 of devices that may share information. In the network 100, content providers 105, such as content provider 115 and server 120, may provide content to any number or type of users or user devices 110 through one or more networks, such as the network 125. Content providers 105 may include television content providers such as broadcast, cable, or satellite television providers, web or Internet content providers, radio content providers, or various other textual, audio, digital, or video content providers. Content provided by content providers 105 may include video content such as subscription cable or satellite content, electronic or web content such as a web page or web site, or other textual, audio, digital, or video data or information.

The users may include businesses, individuals, consumers, governments, or other types of users. The devices 110 may include virtually any type of electronic device. As examples, the device 110 may be a set-top-box "STB" 150 for a monitor or television 155, a television 160, a computer 170, a smart phone 180, or another electronic device, such as a tablet, a smart phone, a personal digital assistant ("PDA"), or a smart card. Devices 110 may be configured to receive content, such as content provided by content providers 105 through the network 125. A device 110 configured to receive content may additionally operate as a content provider 105 and provide content for other devices 110 over the network 125.

The devices 110 may be configured to derive keys, which the device 110 may use in connection with displaying, delivering, rendering, or otherwise manipulating content received from the content providers 105. For example, content providers 105 may provide content to devices 110 that may be encrypted to prevent unauthorized receipt and use by unauthorized devices or in an unauthorized manner. A device 110 that is authorized may be configured to derive content keys to decrypt the encrypted content. The device 110 may derive the content keys before, during or after the device 110 receives the encrypted content. Derivation of keys may include accessing stored keys or other information, deriving new keys from pre-stored keys in the device, or generating keys with gathered device settings information. The keys of the device 110 may be derived using security information about security settings implemented in the hardware of the device 110. This may ensure that the security settings are implemented correctly at the appropriate time, and also may prevent administrative or manufacturing errors or deliberate attempts to circumvent security measures in the device 110.

The devices 110 may be created by one or more manufacturers according to specifications provided by a content provider 105. For example, a content provider 105 broadcasting subscription content may contract with a conditional access provider to protect the subscription content delivered to an STB 150. The conditional access provider may work with a component manufacturer to design components of the device 110 that are secure and meet the needs of the content provider 105. The conditional access provider, or the component manufacturer, may also work with a final product manufacturer, such as an original equipment manufacturer ("OEM"), to ensure that other security needs of the content provider 105 are implemented in the STB 150. As will be described in detail below, the security settings of a device 110 may influence key generation in that device 110.

Figure 2:
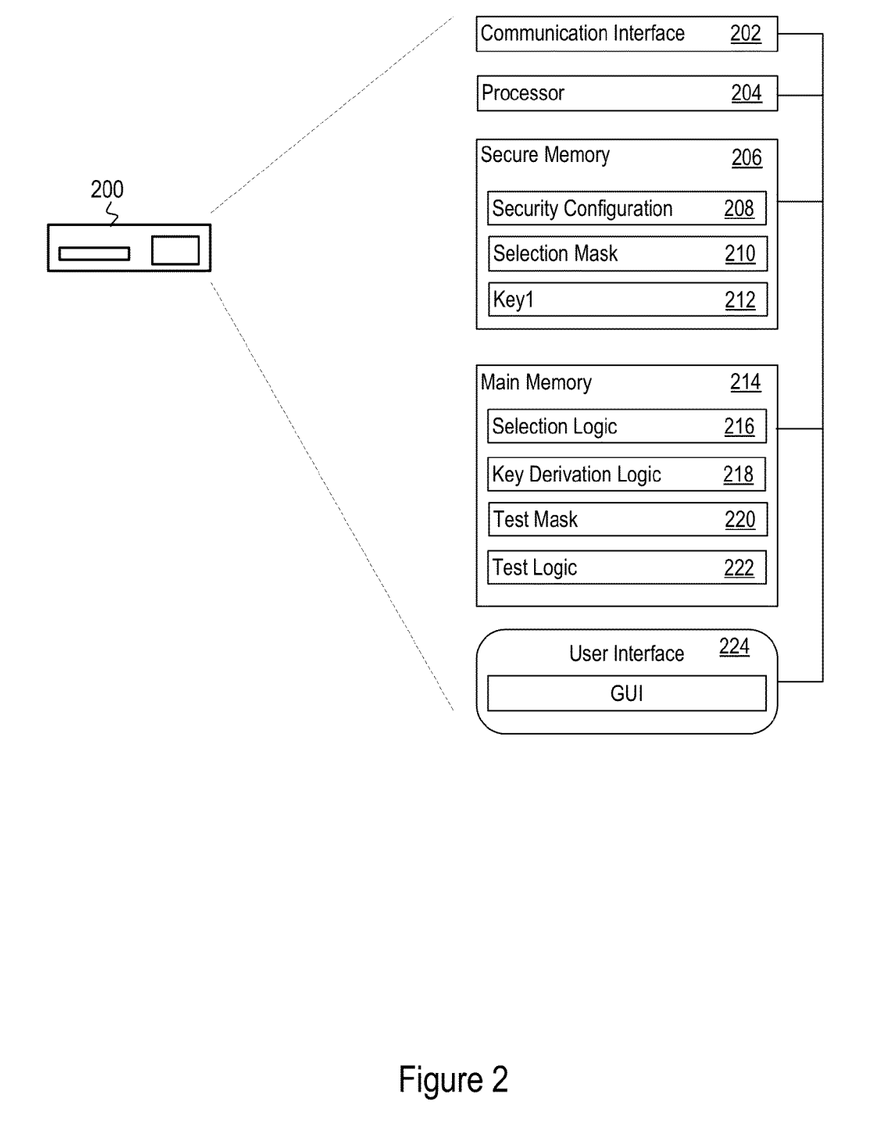
FIG. 2 is an example of a device that may perform key derivation.

FIG. 2 is an example of a device 200. The device 200 may include logic that may be configured to derive keys to perform various tasks. The device 200 may include a communication interface 202, a processor 204, a secure memory 206, a main memory 214, and a user interface 224. Fewer, different, or more logic may be included within the device 200.

The communication interface 202 may include or be connected with a transceiver, such as a wired or wireless transceiver, and an antenna for transmitting or receiving signals. The communication interface 202 may communicate through the transceiver or antenna to send or receive content from content providers 105 or other devices.

The processor 204 may be or include a central processing unit ("CPU"), a graphics processing unit ("GPU"), or both. The processor 204 may be configured to run or execute one or more functions, software, code, logic, or other applications, such as selection logic 216, key derivation logic 218, or test logic 222.

The secure memory 206 may be protected from attacked or unauthorized use of information or data stored within the secure memory 206. The secure memory 206 may be programmed at the factory as part of the device manufacturing process, e.g., as part of the initial device configuration process prior to shipment to consumers. For example, the secure memory 206 may be one-time programmable memory. In other words, the secure memory 206 may be a memory that prevents alteration to its contents once programmed, or that is physically unable to be altered once programmed. The secure memory 206 may store a security configuration 208, a selection mask 210, and a content key, e.g., the content key "key1" 212.

The main memory 214 of the device may be any type of memory, including dynamic random-access memory ("DRAM") or static random-access memory ("SRAM"), as examples. The main memory 214 may be operable to store instructions, code, or logic executable by the processor 204 for performing key derivation processes or other tasks. The secure memory 206 and the main memory 214 may be the same memory, may overlap, or may be distinct from each other. The main memory 214 of the device 200 may store logic executable by the processor 204, such as selection logic 216, key derivation logic 218, or test logic 222. The main memory 214 may additionally be configured to store a test mask 220.

The user interface 224 of the device 200 may display a graphical user interface ("GUI"). The display may act as an interface for a user to see the functioning of the processor 204, or specifically as an interface with the logic stored in memory, such as secure memory 206 or main memory 214.

The device 200 may be manufactured and programmed with security settings to implement any desired operation of the device 200. The security settings may be implemented in hardware of the device 200. The security configuration 208 stored in the secure memory 206 may include information concerning the security settings that are implemented in the device 200, such as security state information that identifies a state of the security settings. The security state information may indicate whether the security settings have or have not been implemented, or alternatively may indicate whether the security settings have or have not been implemented properly and without errors. The security configuration 208 may represent an accurate reflection in logic of the current state of the hardware of the device 200.

In other implementations, the processor 204 obtains the security configuration 208 (or parts of the security configuration 208) from other logic in the system. For example, the processor 204 may read values from specific memory locations to obtain all or part of the security configuration 208. Alternatively or additionally, the processor 204 may exchange messages with other subsystems within the device 200 that themselves check for and return hardware configuration setting information to the processor 204.

The security configuration 208 may include a configuration array of bits. The bits of the configuration array may represent the security settings of the device 200. The value of the bits may represent a security state of the security settings corresponding to the bits. For example, a bit of the configuration array may be set to a predetermined logic value, e.g., "1", when a security setting represented by the bit has been implemented in the device 200 (or has been implemented properly or without errors). The bit may be set to a different predetermined logic value, e.g., "0", when the security setting represented by that bit has not been implemented in the device 200 (or has been implemented improperly or with errors). The configuration array may use multiple bits to represent a security setting, e.g. by using three bits to represent one of eight possible security features or security feature settings. Additionally or alternatively, the security state information of the security configuration 208 may be stored or represented in various other ways. For example, the security configuration 208 may identify security state information using textual or numerical strings, or other indicia.

The security configuration 208 may be set by a component manufacturer, an OEM, or in the field by an end user. Typically, the security configuration 208 is set when the device security settings are established at the end of the device manufacture. As such, the security configuration 208 typically does not change after the final manufacture of the device. However, in other implementations, device security settings may change during the lifetime of the device, and the security configuration 208 may correspondingly change to reflect the current security state implemented in the device 200.

The device 200 may use the selection mask 210 to select all or a subset of the security state information in the security configuration 208 for use in deriving various keys. The subset of security state information may represent security settings that may be desirable to be implemented, or properly implemented without errors, prior to deriving keys for the device 200. Some examples of desirable security settings or states may include a test port disable setting that may disable test port testing capabilities, a secure boot enable setting, a trust authority selection setting for an owner of an asymmetric key used for secure boot, or various other security settings such as other settings related to the security level or function of the device 200. The selection logic 216 may use the selection mask 210 to select the subset of security state information that corresponds to the desired security settings.

Typically, a content provider 105 specifies its desired security settings, e.g., those security settings that the content provider requires the device 200 to implement before the device 200 is allowed to decrypt and display content. A component manufacturer may then program the secure memory 206 with the selection mask 210 in accordance with the specified security settings prior to sending the secure memory 206 to an OEM for final assembly. However, in other implementations, the selection mask 210 may be determined and set at various other times during or after the manufacturing of the device 200.

The selection mask 210 may include a selection array of bits. The bits of the selection array may represent the security settings of the device 200. The selection array may be the same or a similar size as the configuration array of bits. The bits of the selection array may correspond to the same security settings as like-positioned bits of the configuration array of bits.

The value of the bits may represent whether the security settings is or is not a desired security setting. For example, a bit of the selection array may be set to a predetermined logic value, e.g., "1", when the security setting represented by the bit is a desired security setting. The bit may be set to a predetermined logic value, e.g., "0", when the security setting represented by the bit is not a desired security setting.

The selection logic 216 may apply the selection mask 210 to the security configuration 208 to select the subset of security state information that corresponds to the desired security settings. For example, the selection logic 216 may perform a bitwise AND function using the configuration array and the selection array. The selection logic 216 may pass the value of a bit in a configuration array when the corresponding bit in the selection array is a predetermined logic value, such as a "1". The selection logic 216 may pass a different predetermined logic value, such as a "0", for bits in the configuration array when the corresponding bit in the selection array is a different predetermined logic value, such as a "0". The key derivation logic 218 may receive the selected subset of security state information from the selection logic 216.

The key derivation logic 218 may be unique to the device 200. The key derivation logic 218 may perform encryption algorithms, decryption algorithms, key generation algorithms, key derivation algorithms, advanced encryption system ("AES") decryption algorithms, or various other algorithms.

The key derivation logic 218 may access the key1 212. The key1 212 may be a secret content key stored in the secure memory 206. The key1 212 may be unique to the device 200 and may not be available for display to a user of the device 200. The key1 212 may be randomly generated, or may include one or more of a device or hardware specific identification (ID), a signature of a device or hardware, an Application ID, Application information, personal information associated with a user of the device, or combinations of information.

Figure 3:
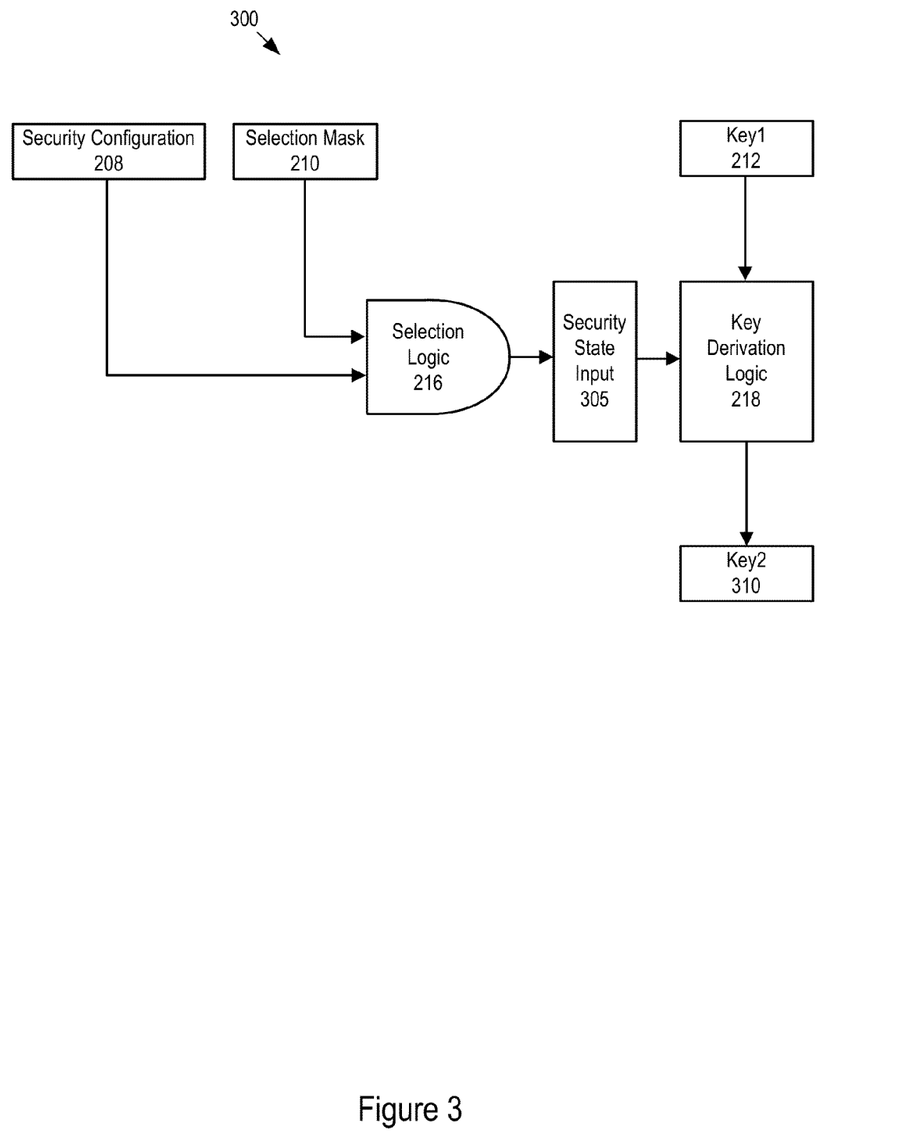
FIG. 3 is an example diagram of a key derivation procedure.

The key derivation logic 218 may include instructions to perform one or more algorithms or processes using the selected subset of security state information from the selection logic 216 and the key1 212. The key derivation logic 218 may output a key2 310 based on the algorithms or processes performed. The key2 310 may be a content key, effective root key, or other key.

The derived key2 310 may depend on the accuracy or validity of the key1 212 and the security state information of the device 200. The key derivation logic 218 may derive a valid key2 310 when the key1 212 is correctly encoded in the secure memory 206 and when the security state information indicates that the desired security settings of the device 200 have been properly set.

The key derivation logic 218 may process key1 212 to derive the key2 310. The device 200 may then use key2 310 to decrypt content delivered to the device 200. Accordingly, when key1 212 is incorrect (e.g., due to modification whether malicious or not), then the key2 310 will not be able to decrypt the delivered content. More particularly, the key derivation logic 218 processes key1 212 in concert with the security state input 305 to derive a key2 310 that depends upon the security state of the device 200. Accordingly, when the security state information indicates that a desired security setting of the device 200 has not been properly set, the key derivation logic 218 may derive a key2 310 that is not able to decrypt content delivered to the device 200 (or perform any other functions for which a correct key2 310 is needed).

The device 200 may include a test mask 220 and test logic 222 for use when testing the settings and operation of the device 200. The device 200 may use the test mask 220 to set the security state information input to the key derivation logic 218 to a known value. The test logic 222 may combine the test mask 220 with the output of the selection logic 216 to exclude some or all of the security state information in the security configuration 208. For example, the test logic 222 may combine the test mask 220 and the output of the selection logic 216 to output security state information that matches an unprogrammed state of the device 200.

The test mask 220 may be a software programmable mask. The test mask 220 may include a test array of bits. The test array may be the same or a similar size as the configuration array or selection array. The bits of the test array may correspond to the same security settings as like-positioned bits of the configuration array or selection array of bits.

The value of the bits may represent whether the security state information of the security configuration 208 corresponding to that bit may be excluded. For example, a bit of the test array may be set to a predetermined logic value, e.g., "0", when the security state information of the security configuration 208 is to be excluded. The bit may be set to a different predetermined logic value, e.g., "1", when the security state information of the security configuration 208, if output from the selection logic 216, is not to be excluded. In some examples, the test mask 220 may be an array that includes only one type of predetermined logic value, such as only "0" values, though other variations are possible.

The test logic 222 may apply the test mask 220 to the output of the selection logic 216 to control security state information input to the key derivation logic 218. For example, the test logic 222 may perform a bitwise AND function using the array output from the selection logic 216 and the test mask 220. The test logic 222 may pass a "0" value for a bit in the array output from the selection logic 216 when the corresponding bit in the test array is a predetermined logic value, such as a "0". The test logic 222 may pass a bit from the array output from the selection logic 216 when the corresponding bit in the test array is a different predetermined logic value, such as a "1". The key derivation logic 218 may derive a test key from the received array of bits output from the test logic 222 and the key1 212. Using the test mask 220 and test logic 222, the device 200 may maintain and test the key derivation function 218 irrespective of the actual security configuration 208 or programmed security settings of the device 200.

One or more manufacturers may create and program the components of the device 200, and may do so all at once, or at different times. For example, a component manufacturer may create the secure memory 206 of the device 200, and may write the key1 212 and the selection mask 210 into the secure memory 206. An OEM may receive the secure memory 206 from the component manufacturer and assemble the secure memory 206 with other components of the device 200. The OEM may implement various security settings of the device 200 and may program the secure memory 206 with the security configuration 208 at the end of their production phase. The security configuration 208 may represent a final description of the security settings implemented in the device 200. Because the key derivation logic 218 relies on a valid key1 212 and a valid security configuration 208, the key derivation logic 218 may generate a valid key2 310 when both the component manufacturer and the OEM have properly programmed the secure memory 206 of the device 200.

FIG. 3 is an example diagram of a key derivation procedure. The processor 204 may derive a key, such as key2 310, using the security configuration 208, the selection mask 210, the key1 212, the selection logic 216, and the key derivation logic 218. The selection logic 216 may receive the security configuration 208 and the selection mask 210 as inputs. The selection logic 216 may apply the selection mask 210 to the security configuration and derive the security state information corresponding to the desired security settings. The selection logic 216 may provide the derived security state information to the security state input 305.

Alternatively or additionally, the device 200 may use all of the security state information of the security configuration 208 to derive the key2 310. In some such systems, no selection mask 210 or selection logic 216 may be needed to select a subset of the security state information in the security configuration 208. Rather, the security configuration 208 may be passed to the security state input 305.

The security state information that is present at the security state input 305 may be received and as an input for the key derivation logic 218. The key derivation logic 218 may also or alternatively access the key1 212 as another input. The key derivation logic may perform one or more algorithms or processes using the security state information and the key1 212 to derive a content key2 310. The content key2 310 may be based on the security settings of the device 200, and may be used to perform various security, decryption, or encryption functions for the device 200. The use of security state information by the device 200 in generating content keys2 310 may ensure that the device 200 is properly and securely configured prior to performing highly personal, confidential, or secure processes.

Figure 4:
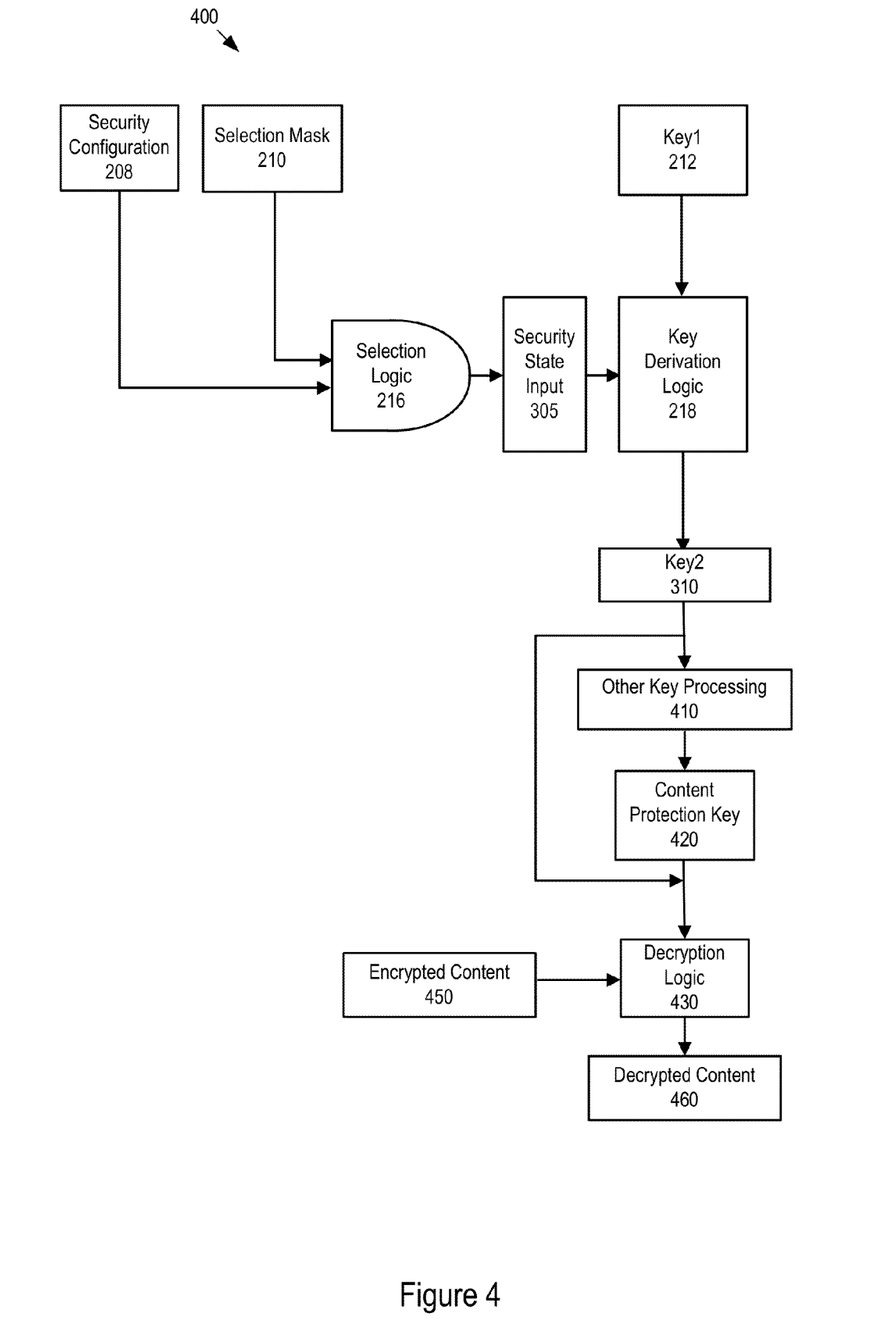
FIG. 4 is an example diagram of a key derivation procedure.

FIG. 4 is an example diagram of a key derivation procedure. The processor 204 may derive a key, such as key2 310 using the security configuration 208, selection mask 210, selection logic 216, key1 212, security state input 305, and key derivation logic 218.

The device 200 may receive encrypted content 450, such as subscription television or internet content. The processor 204 may use the key2 310 with decryption logic 430 to decrypt the encrypted content 450. Additionally or alternatively, the processor 204 may perform other key processing 410 on the key2 310 to generate a content protection key 420. The processor 204 may use the content protection key 420 with the decryption logic 430 to decrypt the encrypted content 450. The device 200 may output the decrypted content 460 as a result of the decryption logic 430. The decrypted content 460 may be displayed to a user of the device 200, such as by or through the user interface 224.

The ability to decrypt the encrypted content 450 or the validity of the content protection key 420 may depend on the validity of the key2 310, which in turn may depend on the validity of key1 212 and the security state information of the device 200. The key2 310 may only be able to accurately decrypt the encrypted content 450, or generate a valid content protection key 420, when the key2 310 is valid, such as when the key1 212 is correctly encoded in the secure memory 206 and when the security state information indicates that the desired security settings of the device 200 have been properly set.

Alternatively, when the key2 310 is not valid, such as when the security state information indicates that a desired security setting of the device 200 has not been properly set, the key2 310 may not accurately decrypt the encrypted content 450 or be used to generate a valid content protection key 420. In this example, even when the encrypted content 450 is received as part of a legal subscription, the decryption logic 430 may not decrypt it as a result of an improperly configured device 200.

Content provider 105 providing encrypted content 450 may work with a manufacturer of the device 200 in setting a valid key2 310 or content protection key 420. The content provider 105 may inform the manufacturer of what security settings that the content provider 105 requires set before the device 200 is secure for the content provider's purposes. The manufacturer may program the secure memory 206 with the selection mask 210 to allow security state information for the desired security settings from the security configuration 208 to be passed. The key2 310 or the content protection key 420 may be derived based on the security state input 305 received by the key derivation logic 218.

Figure 5:
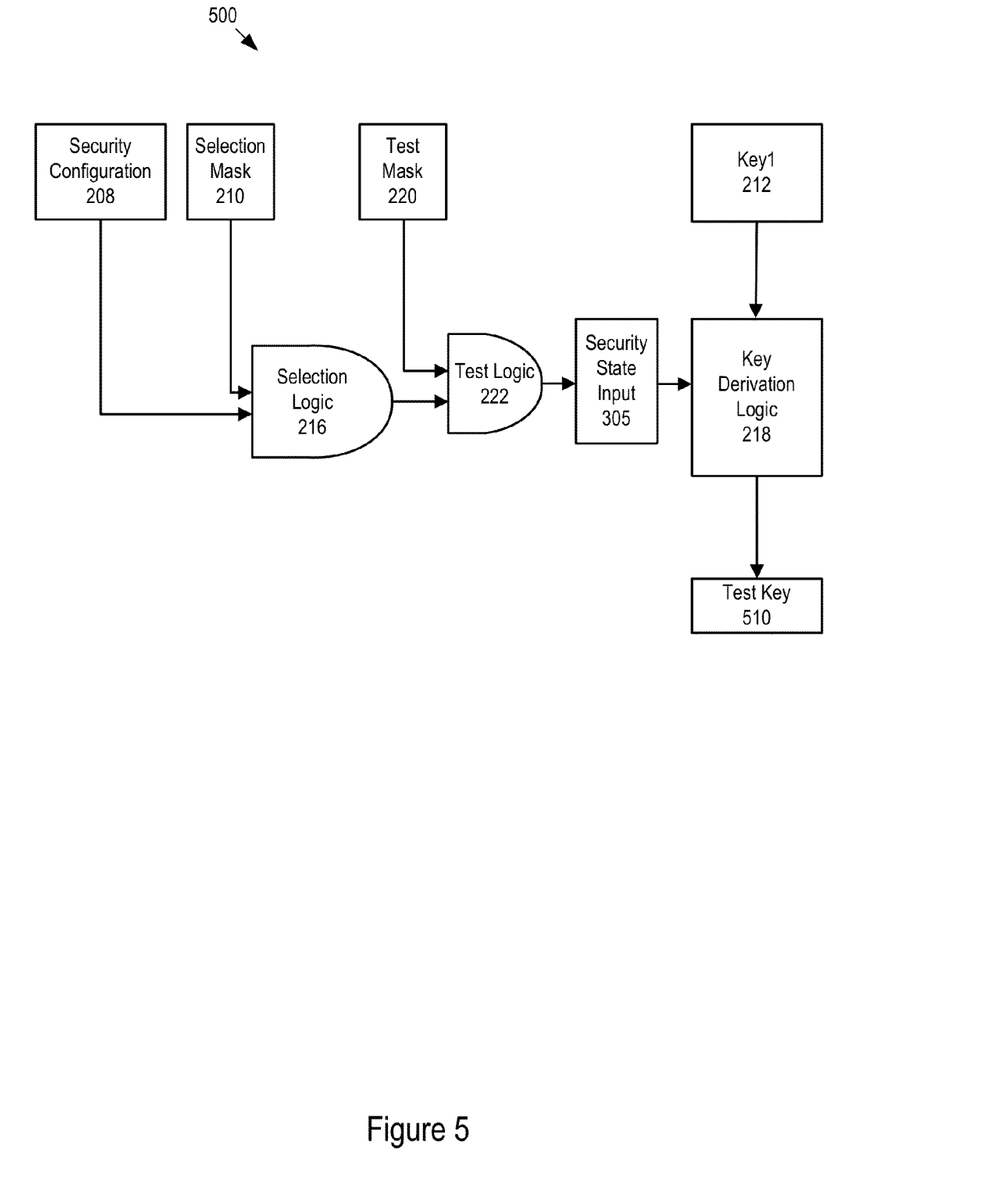
FIG. 5 is an example diagram of a test key derivation procedure.

FIG. 5 is an example diagram of a test key derivation procedure. The device 200 may derive a test key 510 using the security configuration 208, selection mask 210, selection logic 216, test mask 220, test logic 222, key1 212, security state input 305, and key derivation logic 218.

The processor 204 may use the security configuration 208, selection mask 210, and selection logic 216 to receive an output of security state information corresponding to the desired security settings. The test logic 222 may receive the output of the selection logic 216 and combine it with the test mask 220. The test logic 222 may use the test mask 220 to exclude some or all of the security state information output from the selection logic 216.

The key derivation logic 218 may receive the output from the test logic 222, and may gather the stored key1 212. The key derivation logic 218 may use the algorithms used to derive the key2 310 to derive the test key 510. The test key 510 may not be a valid key for use with decrypting encrypted content 450.

A manufacturer may use the test key 510 to conduct additional testing of systems and components the device 200. For example, a manufacturer may derive a test key 510 using a test mask 220 that produces security state information representing an unprogrammed state of the device 200. The manufacturer may then use the test key 510 as an effective root key to test features of the device 200.

A manufacturer may additionally or alternatively use the test key 510 to test whether the key1 212 has been properly programmed. The key derivation logic 218 may output a first value for the test key 510 when the key1 212 has been properly programmed into the secure memory 206. Because the output of the test logic 222 and the key derivation logic 218 may be controlled and known, the valid first value for the test key 510 may be predicted for a valid key1 212. When the key1 212 has alternatively not been properly programmed, the key derivation logic 218 may output any number of different values for the test key 510. The different values may indicate that the key1 212 was not programmed, or that the key1 212 was improperly programmed into the secure memory 206.

The device 200 may use the test mask 220 and the test logic 222 before, during, or after the programming of the secure memory 206. In some examples, the test mask 220 and the test logic 222 may provide little or no risk for infiltration of the device 200, such as where the test mask 220 and test logic 222 are configured to exclude security information and revert the key derivation logic 218 to match an unprogrammed state of the device 200.

Figure 6:
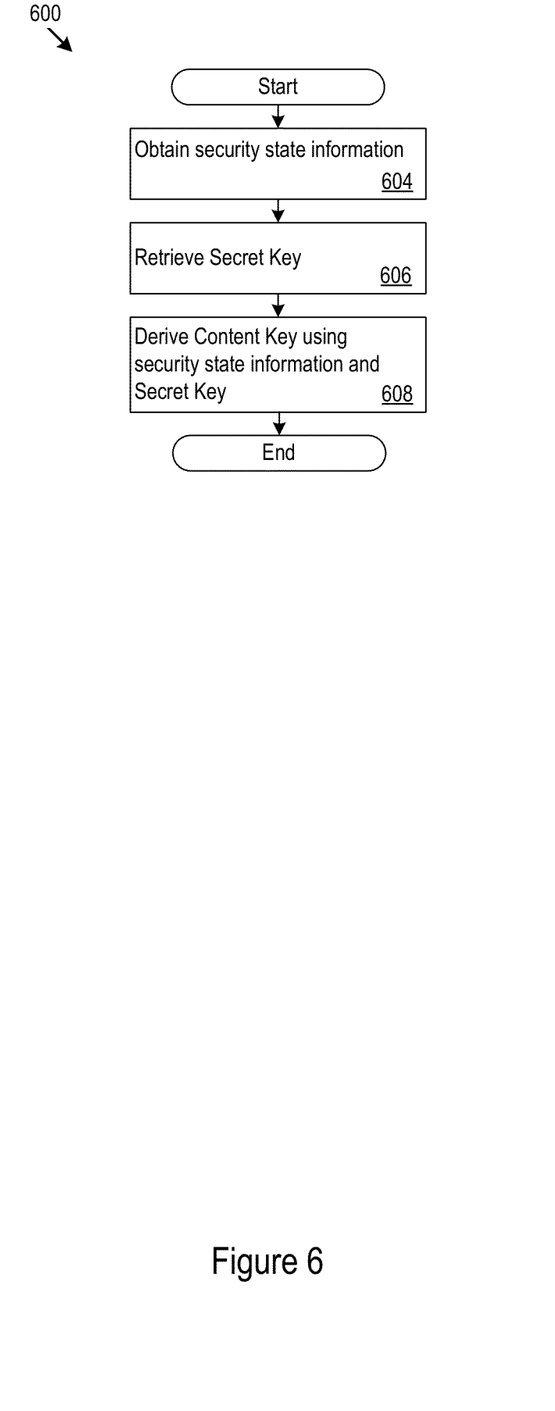
FIG. 6 is an example of logic for deriving a key.

FIG. 6 is an example flow diagram of logic 600 for deriving a key. A device 200 may implement the logic 600 in hardware, software, or both, to derive a content key, such as key2 310. The processor 204 may obtain security state information for the device 200 (604). The security state information may include information about whether or not security settings have been implemented in hardware of the device 200. The processor 204 may obtain the security state information from the security configuration 208, such as using the selection mask 210 and the selection logic 216.

The processor 204 may retrieve a secret key, such as the key1 212 (606). The secret key may be stored in the secure memory 206 and may be unique to the device 200. In other implementations, the logic 600 may perform (604) and (606) in reverse order or at the same time.

The device 200 may derive a content key using the security state information and the secret key (608). For example, the processor 204 may perform an encryption or decryption algorithm to derive the content key. The processor 204 may use logic, such as the key derivation logic 218, to derive the content key. The derived content key may depend on the security state information of the device 200.

Figure 7:
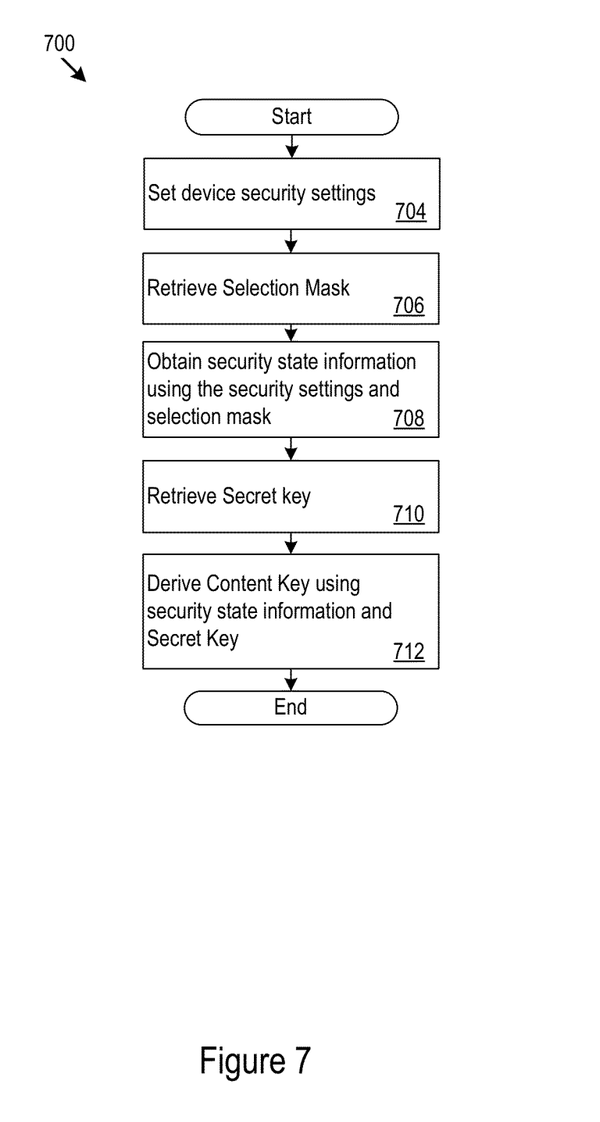
FIG. 7 is an example of logic for deriving a key.

FIG. 7 is an example flow diagram of logic 700 for deriving a key. A device 200 may implement the logic 700 in hardware, software, or both, to derive a content key, such as key2 310. The device 200 may be programmed or implemented with security settings in hardware of the device 200 (704). The security configuration 208 may be created and updated to reflect the security settings programmed or implemented in the hardware of the device 200.

The processor 204 may retrieve the selection mask 210 (706). The processor 204 may obtain security state information using the security settings and the selection mask (708). The security state information may include a subset of the security state information in the security configuration 208. The subset of security state information may represent security settings that a content provider 105 may desire to be implemented, or properly implemented without errors, prior to deriving keys for the device 200. The processor 204 may apply selection logic 216, using the security configuration 208 and the selection mask 210 as inputs, to obtain the security state information.

The processor 204 may retrieve the secret key, such as the key1 212 (710). The secret key may be stored in the secure memory 206 and may be unique to the device 200.

The device 200 may derive a content key using the security state information and the secret key (712). For example, the processor 204 may perform an encryption or decryption algorithm to derive the content key. The processor 204 may use logic, such as the key derivation logic 218, to derive the content key. The derived content key may depend on the security state information of the device 200. In other implementations, the logic may perform (704), (706), (708), (710), and (712) in a different order or at different times.

Figure 8:
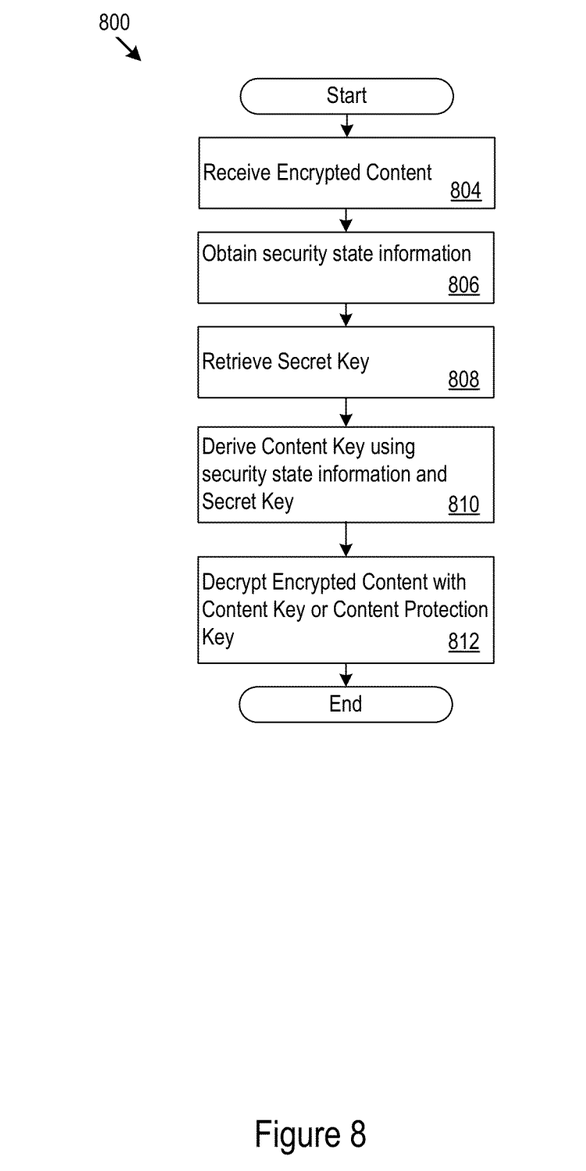
FIG. 8 is an example of logic for decrypting content.

FIG. 8 is an example flow diagram of logic 800 for decrypting content. The device 200 may implement the logic 800 in hardware, software, or both, to decrypt encrypted content, such as encrypted content 450. The device 200 may receive encrypted content, such as by or through the communication interface 202 (804). The encrypted content may, for example, be subscription television or web content, or other electronic content.

The processor 204 may obtain security state information for the device 200 (806). The security state information may include information about whether or not security settings have been implemented in hardware of the device 200, and may obtain the security state information from the security configuration 208, such as using the selection mask 210 and the selection logic 216.

The processor 204 may retrieve a secret key, such as the key1 212 (808). The device 200 may derive a content key, such as key2 310, using the security state information and the secret key (810).

The device 200 may decrypt the encrypted content using the content key 310, or using a content protection key 420 generated by performing other key processing functions 410 on the key2 310 (812). The processor 204 may apply the decryption logic 430 to the encrypted content 450 using the content key key2 310 or the content protection key 420. The device 200 may output the decrypted encrypted content 450 as decrypted content 460.

In other implementations, the logic 800 may perform (804), (806), (808), (810), and (812) in a different order or at different times. For example, the device 200 may receive the encrypted content 450 at any time, such as before, during, or after deriving the content key or the content protection key.

The device 200 may be programmed to operate in a debug mode. For example, the processor 204 may run debug logic stored in memory, such as the main memory 214. The debug logic may control the security state input 305 to the key derivation logic 218. The debug logic may allow emulation of the correct settings of the device 200 under security firmware control. The emulation may be based on an independent secure memory 206 control that may be set by a component manufacturer in specific parts to facilitate debugging of the device 200. The debug logic may bypass a particular security configuration 208.

The methods, devices, and logic described above may be implemented in many different types of devices 110. The derivation of keys of the device 110 using security state information about the device 110 may ensure that the security options are properly set, and also may identify an unprogrammed or improperly programmed secure memory 206. The derivation of keys using the security state information may also prevent administrative or manufacturing errors or deliberate attempts to circumvent security measures in the devices 110.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   within a device:
   obtaining a device security state by comparing a selection mask and a security configuration of the device, the selection mask indicating a set of desired security settings, and the security configuration indicating implemented device security settings;
   retrieving a first content key stored within the device; and
   deriving a second content key using the first content key and the device security state.

2. The method of claim 1, where the device security state includes one or both of a secure boot enable state and a test port disable state.

3. The method of claim 1, where the device security state indicates whether a device security setting has been implemented in hardware of the device.

4. The method of claim 1, further comprising:
receiving encrypted content at an interface of the device; and
decrypting the encrypted content using the second content key.

5. The method of claim 1, where the first content key is stored in one-time programmable memory within the device.

6. The method of claim 1, where the selection mask specifies a subset of the security configuration that determines the device security state.

7. The method of claim 6, where the device security configuration comprises a security bit array, the security bit array configured to store data that indicates whether security settings have been implemented on the device.

8. The method of claim 1, where comparing the selection mask and the security configuration comprises performing a logical AND operation on at least a portion of the selection mask and at least a portion of the security configuration.

9. The method of claim 1, where the set of desired settings comprises settings that are implemented on the device.

10. The method of claim 1, further comprising testing security functions of the device; and
where the selection mask comprises a test mask.

11. A device comprising:
memory comprising storage for a security configuration, the security configuration indicating implemented device settings;
an interface, in data communication with the memory, the interface configured to receive a security state, the security state based on a comparison of the security configuration with a selection mask, the selection mask configured to indicate a set of desired security settings; and
logic in communication with the interface, the logic operable to:
obtain a first content key; and
execute a key derivation function with the first content key on the security state to obtain a second content key dependent upon the security state.

12. The device of claim 11, where the security state indicates whether a device security setting has been implemented in hardware of the device.

13. The device of claim 11, where the security configuration comprises a configuration array of bits; and
where the selection mask comprises a selection array of bits, the configuration array and the selection array being the same size.

14. The device of claim 13, where the logic is further operable to derive the security state by performing an AND function using the configuration array and the selection array.

15. The device of claim 11, where:
the selection mask comprises a test mask; and
the logic is further operable to execute the key derivation function with the first content key on the security state after application of the test mask to test the key derivation function.

16. A device comprising:
memory configured to store a first content key and security configuration information, the security configuration information indicating whether the device has been implemented with device security settings;
a communication interface configured to receive encrypted content from a content provider; and
logic in communication with the memory and the communication interface, the logic operable to:
obtain security state information by comparing the security configuration information and a selection mask, the selection mask configured to indicate a set of security settings to be implemented for the content provider;
derive a second content key using the first content key and the security state information; and
decrypt the encrypted content based on the second content key.

17. The device of claim 16, where the memory is one-time programmable memory.

18. The device of claim 16, where the device security settings include one or both of a secure boot enable state and a test port disable state.

19. The device of claim 16, where the logic is further operable to:
obtain a third content key based upon the second content key.

20. The device of claim 19, where the logic is further operable to decrypt the encrypted content with the third content key.

* * * * *